US010122731B2

(12) United States Patent
Latta et al.

(10) Patent No.: US 10,122,731 B2
(45) Date of Patent: Nov. 6, 2018

(54) CONTROLLING INTERACTIONS AND GENERATING ALERTS BASED ON ITERATIVE FUZZY SEARCHES OF A DATABASE AND COMPARISONS OF MULTIPLE VARIABLES

(71) Applicant: Bank of America Corporation, Charlotte, NC (US)

(72) Inventors: Jason D. Latta, Charlotte, NC (US); Nelipher Moyo, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 260 days.

(21) Appl. No.: 15/246,311

(22) Filed: Aug. 24, 2016

(65) Prior Publication Data

US 2018/0063148 A1   Mar. 1, 2018

(51) Int. Cl.
*H04L 29/06* (2006.01)
(52) U.S. Cl.
CPC .................... *H04L 63/102* (2013.01)
(58) Field of Classification Search
CPC .................................................. H04L 63/102
USPC .............................................................. 726/7
See application file for complete search history.

(56) References Cited

U.S. PATENT DOCUMENTS

| 2015/0262126 A1* | 9/2015 | Gillespie | G06Q 10/10 |
| | | | 705/342 |
| 2016/0277511 A1* | 9/2016 | Fang | G06Q 20/145 |
| 2018/0137179 A1* | 5/2018 | Kawanabe | G06F 17/30542 |

* cited by examiner

*Primary Examiner* — Jacob Lipman
(74) *Attorney, Agent, or Firm* — Banner & Witcoff, Ltd.; Michael A. Springs

(57) ABSTRACT

A computing platform may receive, from a web server, entity identification information in different formats, and normalize the entity identification information. After normalizing the information, the computing platform may receive a plurality of interaction records each associated with an interaction between a system and a client of the system. The computing platform may compare the normalized entity identification information with the interaction records of the interactions between the system and the clients of the system. After determining that the entity identification information matches client information for one of the interaction records, the computing platform may send an alert to a control server. The alert may cause the control server to take one or more actions with respect to the client. For example, future attempts by the client to access one or more services offered by the system may be blocked for access by the client.

20 Claims, 9 Drawing Sheets

CONTROLLING INTERACTIONS AND GENERATING ALERTS BASED ON ITERATIVE FUZZY SEARCHES OF A DATABASE AND COMPARISONS OF MULTIPLE VARIABLES

BACKGROUND

Aspects of the disclosure relate to preventing unauthorized access to resources of information systems. In particular, one or more aspects of the disclosure relate to controlling access to resources of an information system based on multiple variables and iterative fuzzy searches of client identification information and interaction history.

As organizations increasingly provide services to a wide variety of clients in many different geographic and virtual locations, those clients may have a wide variety of needs, preferences, and requests for those organizations. At the same time, the organizations must ensure efficient and effective technical operations of computer systems in order to provide secure, safe, and high-quality technical solutions that meet client demands, comply with requirements and regulations, and provide information security.

SUMMARY

Aspects of the disclosure provide effective, efficient, scalable, and convenient technical solutions that address and overcome the technical problems associated with controlling interactions with secured information systems, for example by using iterative fuzzy searches and comparisons of multiple variables.

In accordance with one or more embodiments, a computing platform having at least one processor, a memory, and a communication interface may receive first entity identification information in a first format from a web server, the first entity identification information being associated with an entity. The computing platform may receive second entity identification information in a second format from the web server, the second format being different from the first format, the second entity identification information being associated with the entity. The computing platform may normalize the first entity identification information and the second entity identification information to be in one of the first format, the second format, and a third format different from the first format and the second format. The computing platform may receive a plurality of interaction records, each of the plurality of interaction records being associated with an interaction between a system associated with the analysis server and a client of the system. The computing platform may perform a first comparison between the first entity identification information and one of the plurality of interaction records. The computing platform may perform a second comparison between the second entity identification information and the one of the plurality of interaction records. The computing platform may determine, based on the first comparison and the second comparison, an interaction score that indicates a likelihood that the entity is associated with the one of the plurality of interaction records. The computing platform may, if the interaction score for the one of the plurality of interaction records is above a threshold score, send an alert to a control server, the alert being configured to cause the control server to take an action with respect to the entity.

In some embodiments, the alert may be configured to cause the control server to block or allow a future interaction with a device associated with the entity. Furthermore, the alert may be configured to cause the control server to block the future interaction with the device associated with the entity in response to the interaction score being above the threshold score. The alert may further be configured to cause the control server to allow the future interaction with the device associated with the entity in response to the interaction score being below the threshold score.

In some embodiments, the alert may be configured to cause the control server to set a flag associated with the entity, such that the control server may be configured to allow or block the future interaction with the device further based on the flag. Furthermore, the alert may be configured to cause the control server to add restricted entity information to a client profile associated with the entity, based on the interaction score being above the threshold score.

In some embodiments, the first comparison between the first entity identification information and the one of the plurality of interaction records may include performing fuzzy matching between the first entity identification information and the one of the plurality of interaction records.

In some embodiments, the first entity identification information may include a first entity identification variable and a second entity identification variable, and the one of the interaction records may include a first interaction record variable and a second interaction record variable. Furthermore, the first entity identification variable and the first interaction record variable may include a first type of information. Additionally, the second entity identification variable and the second interaction record variable may include a second type of information, the second type of information being different from the first type of information.

In some embodiments, the first entity identification variable and the first interaction record variable may each be a required variable, such that if the first entity identification variable and the first interaction record variable do not match within a threshold fuzzy match value, the interaction score for the one of the plurality of interaction records is set to zero.

In some embodiments, the second entity identification variable and the second interaction record variable may each be an optional variable, such that the second entity identification variable and the second interaction record variable are not required to match in order for the interaction score for the one of the plurality of interaction records to be greater than zero.

In some embodiments, the first type of information may be entity name information, and the second type of information may be entity address information.

In some embodiments, the computing platform may be configured to, if the interaction score is below the threshold score, send a different message to the control server, the different message causing the control server to store, in association with the one of the plurality of interaction records, the interaction score for the entity.

In some embodiments, the computing platform may be configured to perform a third comparison between third entity identification information and the one of the plurality of interaction records. The computing platform may further be configured to generate an updated interaction score based on the first comparison, the second comparison, and the third comparison. Additionally, the computing platform may be configured to, if the updated interaction score is below the threshold score, send an updating message to the control server, the updating message causing the control server to update the stored interaction score for the entity with the updated interaction score.

In some embodiments, the computing platform may be configured to apply a first weight to the first entity identification variable. Furthermore, the computing platform may be configured to apply a second weight to the second entity identification variable. Additionally, the first weight and the second weight may increase or decrease an impact of the first entity identification variable and the second entity identification variable on the interaction score.

In some embodiments, the computing platform may be configured to, if the interaction score for the one of the plurality of interaction records is above the threshold score, request a different plurality of interaction records associated with a client that is associated with the one of the plurality of interaction records. The computing platform may be further configured to perform a third comparison between the first entity identification information and one of the different plurality of interaction records. Additionally, the computing platform may be configured to perform a fourth comparison between the second entity identification information and the one of the different plurality of interaction records. Furthermore, the computing platform may be configured to determine, based on the third comparison and the fourth comparison, a different interaction score that indicates a different likelihood that the entity is associated with the one of the different plurality of interaction records. The computing platform may also be configured to, if the different interaction score is above the threshold score, send a different alert to the control server, the different alert being configured to cause the control server to store an indication of an association between the entity and the one of the different plurality of interaction records.

In some embodiments, if the different interaction score is above the threshold score, the different alert may be configured to cause the control server to store a different indication of an association between the client and the entity.

In some embodiments, the computing platform may be configured to determine whether the entity is subject to one or more restrictions. The computing platform may, if the entity is subject to the one or more restrictions, implement and/or cause to be implemented the one or more restrictions.

In some embodiments, the computing platform may be configured to request the first entity identification information in the first format from the web server via an application programming interface. Furthermore, receiving the first entity identification information in the first format may include receiving the first entity identification information in response to the requesting the first entity identification information from the web server via the application programming interface.

In some embodiments, the computing platform may be configured to add the client to a blacklist of clients that are not allowed to engage in interactions with a system associated with the analysis server. Furthermore, the computing platform may be configured to revoke one or more privileges of the client based on the client being added to the blacklist of clients.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
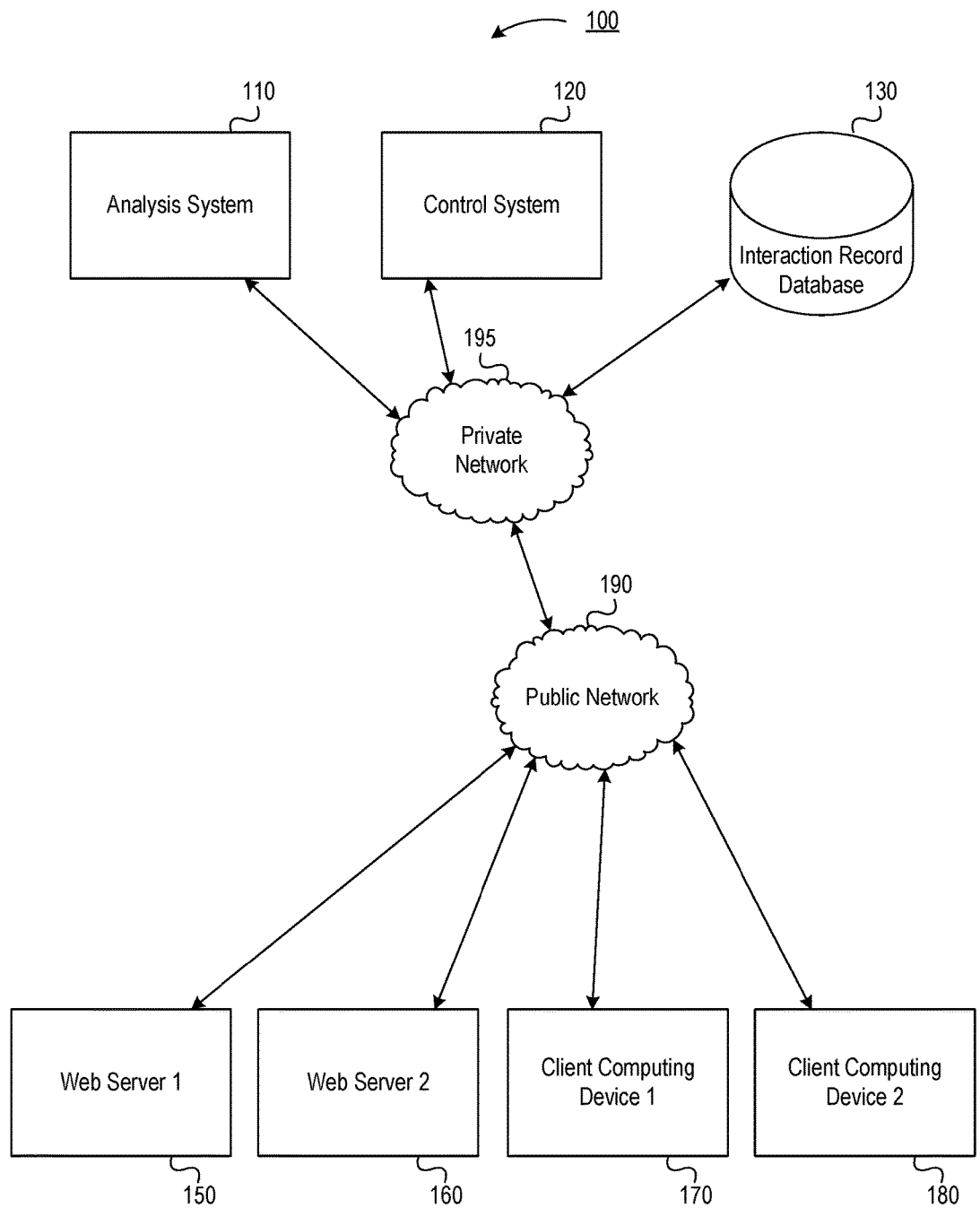
FIGS. 1 and 2 depict an illustrative computing environment for controlling interactions with secured information systems using iterative fuzzy searches and comparisons of multiple variables in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to restricted business identification and alerts regarding restricted businesses. For example, a system may provide a mechanism to identify clients that are engaged in certain types of restricted industries. Restricted industries may require further scrutiny to ensure compliance with regulations (e.g., laws or regulations specific to that industry, personnel regulations, financial regulations, geographic regulations, and the like).

A restricted business may include drug dispensaries (e.g., distribution, cultivation, and retail storefront), gambling, trade associations, car services, adult entertainment, pay-day lenders, private automated teller machine (ATM) owners, and the like. A restricted business may be a cash-intensive business (e.g., perform many and/or primarily cash transactions each day).

A restricted business might be difficult to identify using a name alone. For example, a name of a business might not reflect the type of good or service provided by that business (e.g., a store name "Neighborhood Store" does not signify what is sold at that store).

A web-scraping application may be used for accessing data from governments (e.g., federal, state, county, city, and the like), websites, and the like. For example, some states may maintain registries of business engaging in restricted activity. Websites may include customer review websites, business lookup websites, map websites, enthusiast websites, forums, and business websites. Data may be maintained in different formats (e.g., PDF, spreadsheet, text, HTML, and the like).

The scraped data may normalized and used to create a common dataset of known restricted businesses. A common dataset may be for just one restricted industry, or for businesses in more than one restricted industry.

The data may be used in a matching process against a set of client interactions. A matching process may compare one or more variables of records in a database of recorded interactions against one or more pieces of information from the normalized scraped data. A match process may include, for example, an iterative match and/or a fuzzy match. A search and/or match process may be performed one time and/or may be performed iteratively.

A match score may be generated, based on the likelihood of a match (e.g., the higher the score, the more likely a match has been found). A variable match score may be generated based on one or more variables (e.g., client identifier—such as a name, client address, client city, client state, client zip, client phone). Some variables may be a must-match variable, while other variables may be an optional-match variable. Some variables may be part of a must-match-at-least-one group of variables. A match may be an exact match, or a match may be a low text distance fuzzy match.

A distance score may be applied to two or more key variables (e.g., a client name and a client address). A threshold fuzzy match value may be a certain number lower than the distance score.

In some embodiments, a score within a certain range may trigger further investigation and/or analysis. In some embodiments, a match score may be high enough that further analysis is required. A determination may be made as to the nature of business engaged in by the client.

An alert may be generated, the alert indicating that the client is engaging in restricted business. One or more actions may be taken or automatically triggered by the alert. A flag may be set, based on the determination that the client is engaging in a restricted business. The alert and/or flag may set in motion one or more processes by other systems, which may further investigate the client, block client interactions with one or more systems, transmit communications to the client, receive communications from the client, or otherwise take action based on the analysis results.

A client profile may be updated to indicate whether the client is engaging in restricted activity (e.g., the client is a restricted business). If a client is engaged in a restricted business, past or future interactions with the client may be flagged as requiring further scrutiny, to ensure compliance with regulations. For example, a control system may be notified that the client is a restricted business, and the control system may take action based on the notification.

After identifying a client as being a restricted business, the interactions related to that client may be retrieved and analyzed to refine an analysis process. For example, the analysis process may be updated and refined to better identify characteristics of interactions similar to those that a restricted business may engage in.

One or more steps may be performed on a manual basis or an automated basis. For example, the analysis and matching may be automatically performed on an hourly, daily, weekly, monthly, quarterly, yearly, or other basis. One or more steps (e.g., interaction analysis) may be performed at a system level, or may be performed for a single client or a group of clients.

Figure 2:
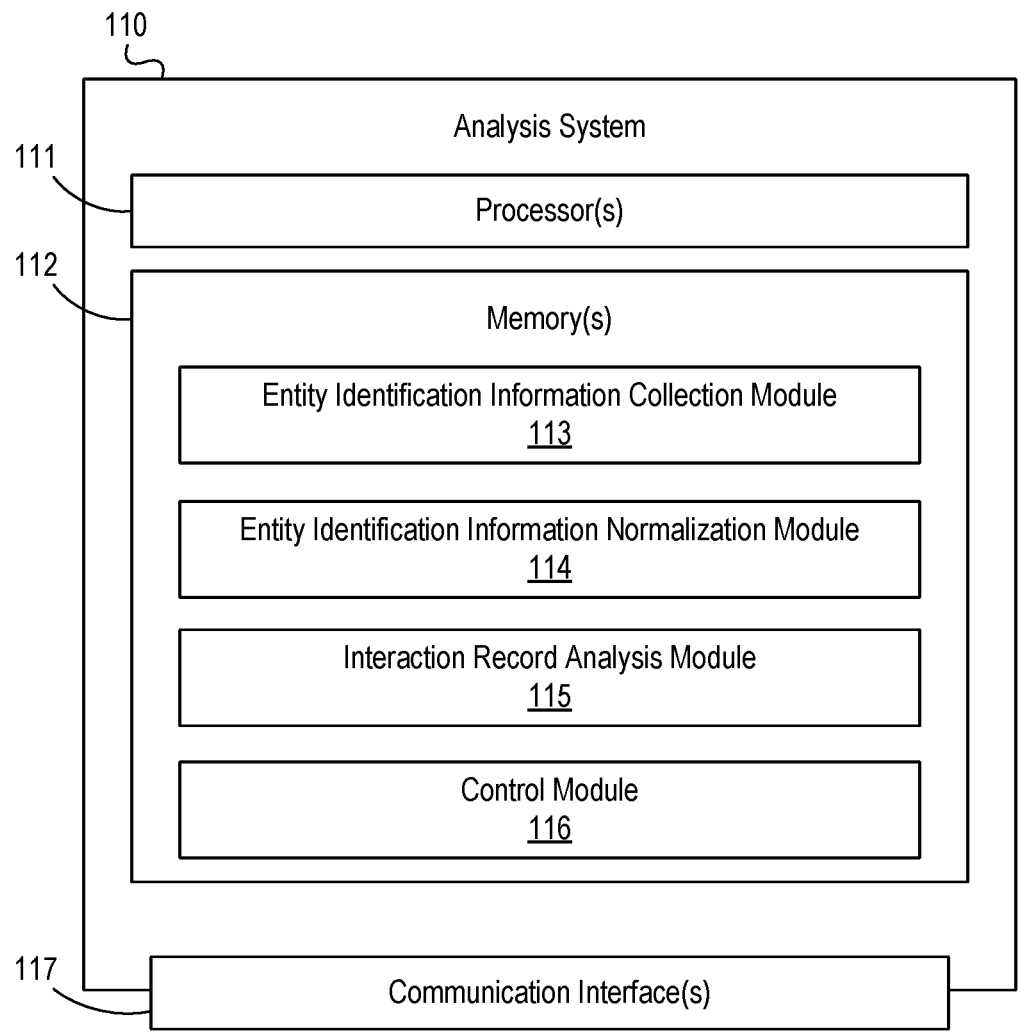

FIGS. 1 and 2 depict an illustrative computing environment for controlling interactions and generating alerts based on iterative fuzzy searches of a database and comparison of multiple variables in accordance with one or more example embodiments. Referring to FIG. 1, computing environment 100 may include one or more computing devices. For example, computing environment 100 may include an analysis system 110, a control system 120, an interaction record database 130, a first web server 150, a second web server 160, a first client computing device 170, and a second client computing device 180.

Analysis system 110 may be configured to analyze entity identification information and interaction records. For example, analysis system 110 may be configured to analyze entity identification information identifying clients of an organization, such as a financial institution, who may use one or more client computing devices (e.g., first client computing device 170, second client computing device 180) to access services provided by the organization, as illustrated in greater detail below. Analysis system 110 may also be configured to analyze entity identification information received from one or more sources, normalize the entity identification information, and compare the entity identification information to interaction records of one or more interactions of clients with one or more systems of the organization. Based on the analysis, analysis system 110 may be configured to determine whether a client is a restricted entity, and may cause a control system (e.g., control system 120) to take one or more actions in response to determining that a client is associated with a restricted entity.

Control system 120 may be configured to control one or more interactions between a client and an organization (e.g., a financial institution, a business, a government entity, a government agency, a non-profit organization, an individual, or the like). Control system 120 may allow or deny an interaction, based on whether a client is associated with an entity that is a restricted entity.

Interaction record database 130 may be configured to manage one or more databases and/or records of interactions with an organization, as discussed in further detail below. As an example, a server, system, device, or apparatus may transmit or receive requests for data or information, or requests to perform or facilitate transactions. The server, system, device, or apparatus may perform the requested transaction, and/or may receive responses to or respond to the requests (e.g., receive or provide the data or information). The interaction record may be a record of the interaction (e.g., the request and/or the response to the request or the action taken in response to the request). Interaction record database 130 may be a part of a different system or device, or may be a standalone system or device that includes one or more databases.

First web server 150 may be configured to provide a website, web page, web service, or the like for an organization (e.g., an organization that is the same as or different from an organization associated with one or more of analysis system 110, control system 120, and/or interaction record database 130). First web server 150 may provide an application programming interface (API) for accessing data. Data provided by first web server 150 may be used by analysis system 110 for determining entity identification information, as discussed in greater detail below.

Second web server 160 may be configured to provide a website, web page, web service, or the like for an organization (e.g., an organization that is the same as or different from an organization associated with one or more of analysis system 110, control system 120, and/or interaction record database 130, and/or an organization that is the same as or different from an organization associated with first web server 150). Second web server 160 may provide an application programming interface (API) for accessing data. Data provided by second web server 160 may be used by analysis system 110 for determining entity identification information, as discussed in greater detail below.

Client computing device 170 may be configured to be used by a first customer of an organization, such as a financial institution. In some instances, client computing device 170 may, for example, be registered with the organization and/or one or more computer systems in computing environment 100, such that the organization and/or the one or more computer systems maintain one or more records linking client computing device 170 to the first customer of the organization, as illustrated in greater detail below. Client computing device 180 may be configured to be used by a second customer of the organization (who may, e.g., be different from the first customer of the organization). In some instances, client computing device 180 may, for example, be registered with the organization and/or one or more computer systems in computing environment 100, such that the organization and/or the one or more computer systems maintain one or more records linking client computing device 180 to the second customer of the organization, as illustrated in greater detail below.

In one or more arrangements, analysis system 110, control system 120, interaction record database 130, first web server 150, second web server 160, first client computing device 170, and second client computing device 180 may be any type of computing device capable of performing one or more functions described herein (e.g., receiving a user interface, receiving input via the user interface, and communicating the received input to one or more other computing devices). For example, analysis system 110, control system 120, interaction record database 130, first web server 150, second web server 160, first client computing device 170, and second client computing device 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of analysis system 110, control system 120, interaction record database 130, first web server 150, second web server 160, first client computing device 170, and second client computing device 180 may, in some instances, be special-purpose computing devices configured to perform specific functions.

Computing environment 100 also may include one or more networks, which may interconnect one or more of analysis system 110, control system 120, interaction record database 130, first web server 150, second web server 160, first client computing device 170, and second client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, analysis system 110, control system 120, and interaction record database 130 may be associated with an organization (e.g., a financial institution), and private network 195 may be associated with and/or operated by the organization, and may include one or more networks (e.g., LANs, WANs, virtual private networks (VPNs), or the like) that interconnect client analysis system 110, control system 120, and interaction record database 130 and one or more other computing devices and/or computer systems that are used by, operated by, and/or otherwise associated with the organization. Public network 190 may connect private network 195 and/or one or more computing devices connected thereto (e.g., analysis system 110, control system 120, interaction record database 130) with one or more networks and/or computing devices that are not associated with the organization. For example, first web server 150, second web server 160, first client computing device 170, and second client computing device 180 might not be associated with an organization that operates private network 195 (e.g., first web server 150, second web server 160, first client computing device 170, and second client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect first web server 150, second web server 160, first client computing device 170, and second client computing device 180 to private network 195 and/or one or more computing devices connected thereto (e.g., analysis system 110, control system 120, and interaction record database 130).

Referring to FIG. 2, analysis system 110 may include one or more processors 111, memory 112, and communication interface 117. A data bus may interconnect processor(s) 111, memory 112, and communication interface 117. Communication interface 117 may be a network interface configured to support communication between client authentication computing platform 110 and one or more networks (e.g., private network 195, public network 190, or the like). Memory 112 may include one or more program modules having instructions that when executed by processor(s) 111 cause analysis system 110 to perform one or more functions described herein and/or one or more databases that may store and/or otherwise maintain information that may be used by such program modules and/or processor(s) 111. In some instances, the one or more program modules and/or databases may be stored by and/or maintained in different memory units of analysis system 110 and/or by different computing devices that may form and/or otherwise make up analysis system 110. For example, memory 112 may have, store, and/or include an entity identification information collection module 113, entity identification information normalization module, interaction record analysis module, and control module 116.

Entity identification information collection module 113 may have instructions that direct and/or cause analysis system 110 to collect entity identification information and/or to perform other functions, as discussed in greater detail below. Entity identification information normalization module 114 may have instructions that direct and/or cause analysis system 110 to normalize entity identification information and/or to perform other functions, as discussed in greater detail below. Interaction record analysis module 115 may have instructions that direct and/or cause analysis system 110 to analyze interaction records and/or to perform other functions, as discussed in greater detail below. Control module 116 may have instructions that direct and/or cause analysis system 110 to control one or more other systems, modules, or devices, and/or to perform other functions, as discussed in greater detail below.

Figure 3A:
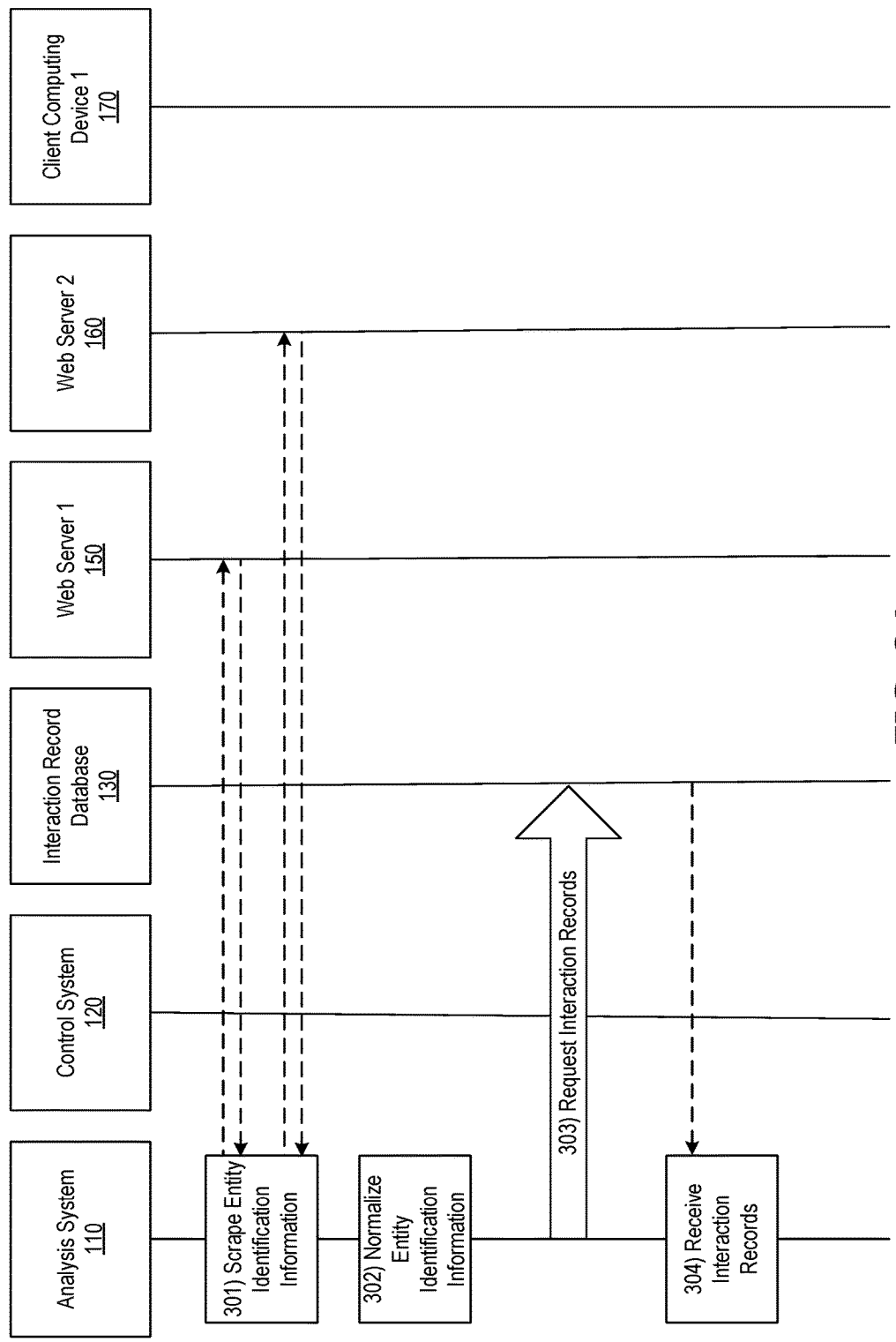
FIGS. 3A-3E depict an illustrative event sequence for controlling interactions with secured information systems using iterative fuzzy searches and comparisons of multiple variables in accordance with one or more example embodiments.

FIGS. 3A-3E depict an illustrative event sequence for controlling interactions with secured information systems using iterative fuzzy searches and comparisons of multiple variables in accordance with one or more example embodiments. Referring to FIG. 3A, at step 301, analysis system 110 may collect entity identification information, e.g., by scraping entity identification information. For example, collecting entity identification information may include screen scraping data from one or more websites. Collecting entity identification information may include requesting and receiving entity identification information from a website or database (e.g., via an application programming interface (API)). Collecting entity identification information may include receiving entity identification information from a private, commercial, and/or government website. A website may be a website of an entity, a mapping website, a review website, a forum, a discussion board, or the like.

Entity identification information may include information that may be used to identify one or more entities (e.g., a business, a person, an organization, a group, and the like). For example, entity identification information may include entity name, address, city, state, zip code or postal code, country, phone number, location (e.g., GPS coordinates), website address, and the like. Entity identification information may include a trademark or slogan associated with the entity.

Entity identification information may be collected in one or more formats. For example, entity identification information may be in portable document format (PDF), HTML, XML, JSON, text, image, video, or other format.

At step 302, analysis system 110 may normalize entity identification information. As noted above, entity identification information may be collected in one or more formats. Analysis system 110 may normalize the entity identification information, such that the entity identification information is in a common format. For example, if entity identification information is received in a non-text format (e.g., image), optical character recognition may be performed to identify text in the image. In another example, text information may be extracted from a PDF or other document format. In a further example, entity identification information may be extracted from a web format (e.g., HTML, JSON). Entity identification information may be saved or stored in a common format (e.g., added to a database, saved in a file, or the like).

At step 303, analysis system 110 may request interaction records from interaction record database 130. An interaction record may be a record of an interaction between a client and a device, a system, an organization, or the like. For example, an interaction record may be a record of a request of a file from a server, a download, an access of a web page, a financial transaction (e.g., a withdrawal, a deposit, a transfer, a payment, and the like), an upload of a file, a login, a logout, or the like. The request for interaction records may be for a particular time period (e.g., the last hour, the last 24 hours, the last week, the last month, the last year, a time period between two dates and/or two times). The request for interaction records may be for interactions with entities that meet a particular criterion (e.g., an entity with a particular name, address, city, state, zip, country, phone number, description, or the like).

An entity may be a restricted entity. A restricted entity may be an entity that participates in activities that may be restricted by law, rule, regulation, and/or other requirements. For example, a restricted entity may be an adult-oriented business, an organization affiliated with gambling, a drug production facility, a drug dispensary, or the like. Thus, even if the business is engaging in legal activity, the business may be deemed and/or treated as a restricted entity based on the business engaging in activity that is regulated.

The request for interaction records may be a request for interaction records associated with an entity that has been predetermined to be or identified as a restricted entity. The request for interaction records may be a request for interaction records with an entity that is known not to be a restricted entity. The request for interaction records may be a request for interaction records with an entity for which it is not known whether the entity is or is not a restricted entity.

At step 304, analysis system 110 may receive interaction records in response to the request for interaction records. The interaction records may be received in a format that is similar to or different from a record that the interaction record is stored in. An interaction record may be stored, for example, as an entry in a database, text, XML, or the like. In some embodiments, the interaction record may be converted to a different format before the interaction record is sent to analysis system 100.

Figure 3B:
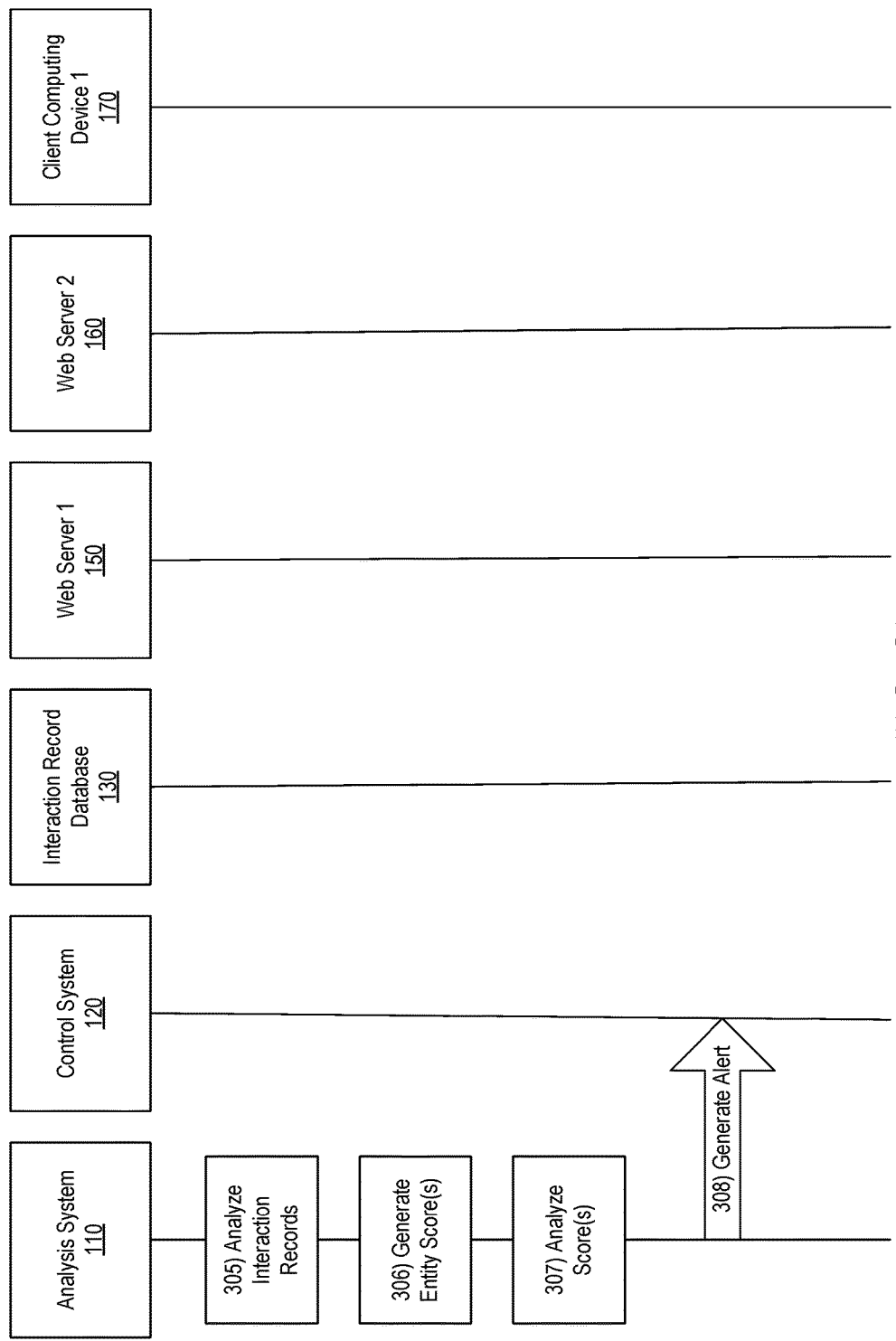

Referring to FIG. 3B, at step 305, analysis system 110 may analyze interaction records. The analysis may include an iterative matching process and/or a fuzzy matching process. Analysis system 110 may perform a text-matching process to match one or more variables of the entity identification information against one or more variables of the interaction records. For example, an entity name in the entity identification information may be compared against an entity name in an interaction record. In another example, an entity address in the entity identification information may be compared against an entity address in an interaction record. In a further example, a characteristic of an identification record may correspond to characteristics of a particular type of entity (e.g., if the identification record is for a large cash transaction or a large number of cash transactions, then a match may be identified with a business or organization that engages in activities that are typically cash-intensive operations).

At step 306, analysis system 110 may generate one or more entity scores (e.g., interaction scores). An entity score may be based on a match between one or more variables of the entity identification information and one or more variables of the interaction record (e.g., a match identified in step 304). For example, if a higher number of variables match, then the score may be higher. If a lower number of variables match, the score may be lower. A match may be an exact match or a fuzzy match. For example, a match may be a text distance fuzzy match. A fuzzy match may allow for a match to be identified even if a match is not a 100% match. A fuzzy match may be based on an approximate match between characters, and/or an approximate match between word definitions.

The matching process may use iterative matching. For example, after a match for a particular variable is identified, one or more previously identified matching or non-matching variables may be re-evaluated. The re-evaluation may have a different evaluation score than the original evaluation score, based on the other identified matches or non-matches. Alternatively or additionally, evaluation of each additional variable may be based on a comparison of that variable, as well as the results of a match or non-match result of a comparison of a previous variable. For example, a city name match may result in a higher score increase if a zip code and/or state also matches, while a city name match may result in a lower score increase or no score increase if a zip code and/or state does not also match.

The score may be a weighted score, such that if a particular variable with a higher weight matches, the score may be increased by a greater amount than if a different variable with a lower weight matches. In some embodiments, an entity score may have one or more components. For example, an entity score may have a component based on a number of matched variables, and another component based on one or more requirements being met. If the one or more requirements are not met, in some embodiments, the entity score may be null or zero.

In some embodiments, one or more variables may be required variables, and/or one or more variables may be optional variables. For example, even if multiple optional variables match, but one or more required variables do not match, then an entity score may be adjusted (e.g., raised or lowered). In some embodiments, a distance score may be applied to one or more key variables (e.g., entity name, entity address). A threshold fuzzy match value may have to be a certain number lower than the distance score between the key variables.

At step 307, analysis system 110 may analyze the one or more entity scores. If the entity score is above a threshold number, analysis system 110 may determine that the entity identified by the entity identification information is or may be the entity that corresponds to the interaction record (e.g., at least one of the entities that engaged in the interaction). If the entity score is below the threshold number, analysis system 110 may determine that the entity identified by the entity identification is not or might not be the entity that corresponds to the interaction record (e.g., not at least one of the entities that engaged in the interaction).

Figure 3C:
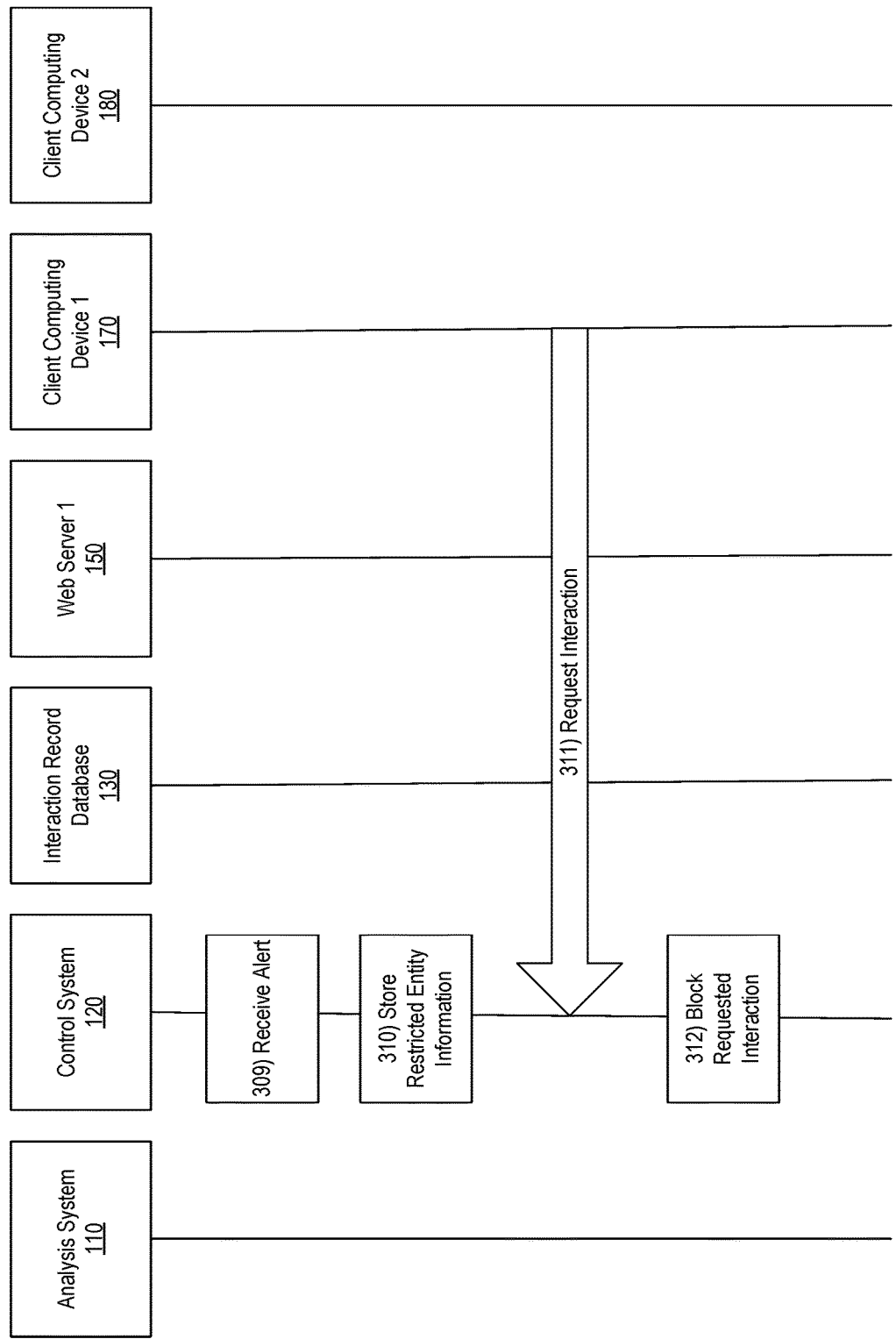

At step 308, analysis system 110 may generate an alert. Analysis system 110 may provide the alert to a different computing device (e.g., control system 120). The alert may indicate that an interaction with a restricted entity has been identified. Referring to FIG. 3C, at step 309, control system 120 may receive the alert.

At step 310, control system 120 may store restricted entity information. For example, control system 120 may store a flag, a database entry, or the like. An interaction may be flagged as an interaction with a restricted entity. A client profile may be updated to indicate whether the client is a restricted entity.

In some embodiments, additional interactions by the client may be identified and analyzed based on the determination that the entity is a restricted entity or not a restricted entity. One or more additional interactions may be flagged as being an interaction with a restricted entity or with a non-restricted entity.

Analysis system 110 may create one or more groups of restricted entities based on the identification of restricted entities. For example, analysis system 110 may create a group of known drug dispensaries, known adult-oriented businesses, known gambling-related entities, or the like.

One or more of steps 301-310 may be performed on an automated or manual basis. For example, the one or more steps may be performed hourly, daily, weekly, monthly, yearly, or on a different time interval. The one or more steps may be performed for all collected entity identification information and/or a subset of collected entity identification. The one or more steps may be performed for all interaction records, and/or a subset of all interaction records.

At step 311, a first client computing device 170 may request an interaction (e.g., request the interaction via control system 120). The interaction may be requested at a similar time or a different time from steps 301-310. The interaction may be a request from a client associated with an entity (e.g., a restricted entity or a non-restricted entity) to perform an interaction with a server, computing device, apparatus, or system associated with an organization, a business, a corporation, a non-profit entity, a government, an individual, or the like. The interaction may be a request to download data, to upload data, to transmit data, to process data, to perform a financial transaction (e.g., a deposit, a withdrawal, a transfer, a payment, or the like), to authenticate a client (e.g., via a username, password, passcode, biometric identifier, multifactor authentication, or the like), to access a webpage, to interact with a mobile device application, or the like.

At step 312, control system 120 may block the requested interaction. Control system 120 may block the requested interaction. For example, control system 120 may block the interaction based on determining that client computing device 170 is associated with a restricted entity (e.g., based on a client profile, a flag associated with past interactions with the client, or the like).

Figure 3D:
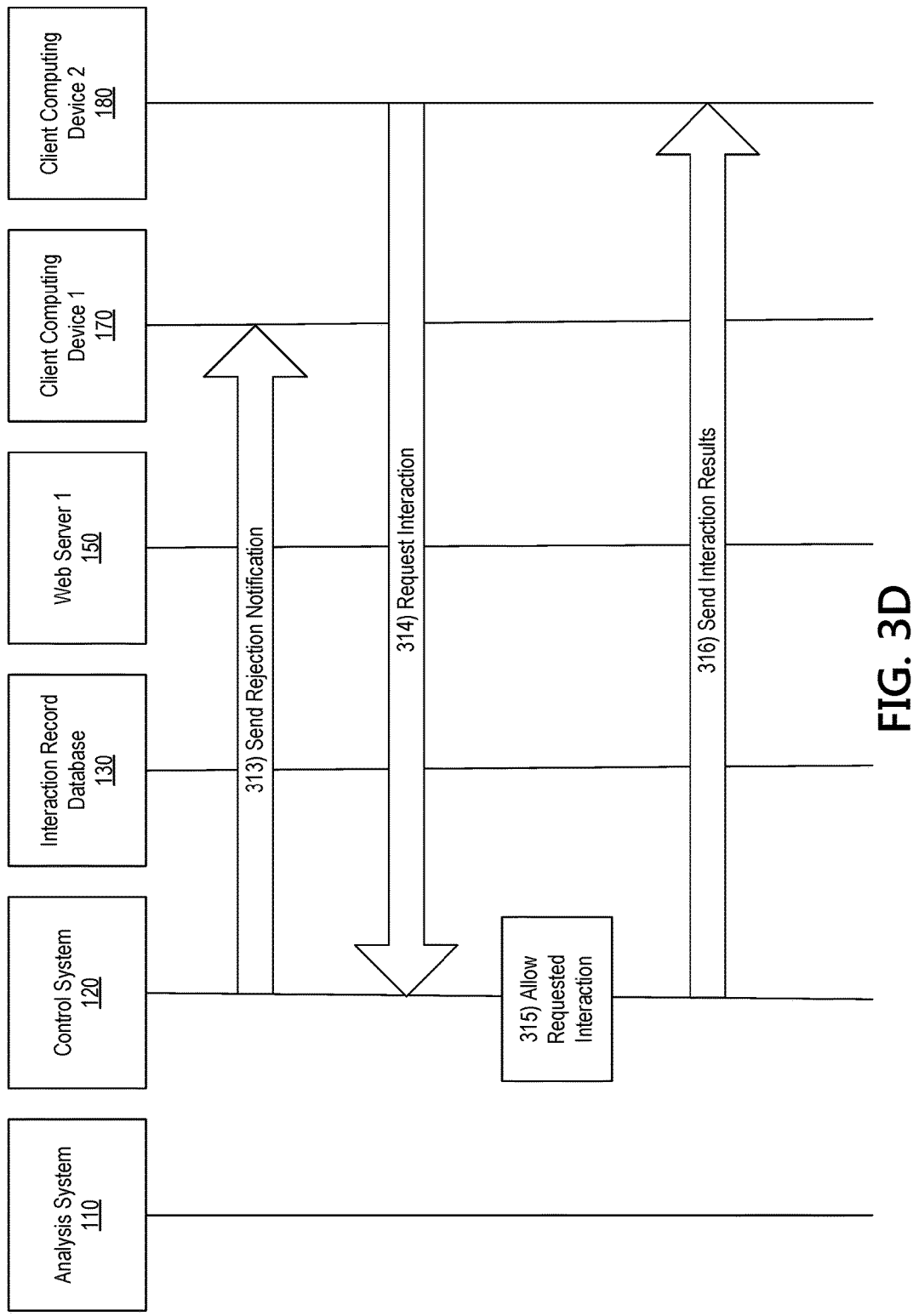

Referring to FIG. 3D, at step 313, control system 120 may send a rejection notification. The rejection notification may indicate that the requested interaction has been rejected.

Figure 4:
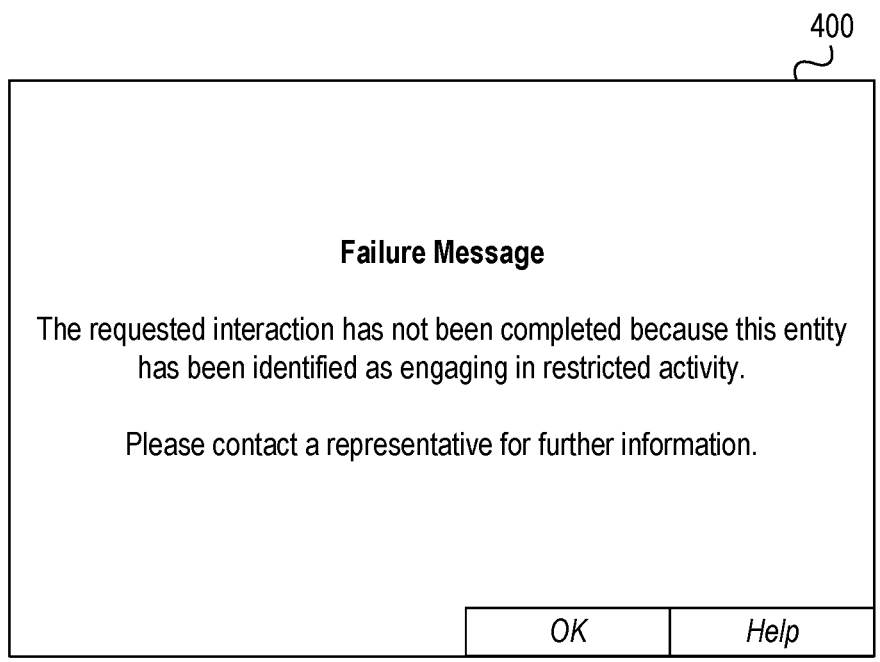
FIG. 4 depicts an example graphical user interface for controlling interactions with secured information systems using iterative fuzzy searches and comparisons of multiple variables in accordance with one or more example embodiments.

Client computing device 170 may present the rejection notification received by client computing device 170 from control system 120. For example, in presenting the rejection notification received by client computing device 170 from control system 120, client computing device 170 may display and/or otherwise present a graphical user interface similar to graphical user interface 400, which is illustrated in FIG. 4. As seen in FIG. 4, graphical user interface 400 may be presented by an operating system executing on client computing device 160 and/or by a mobile banking application executing on client computing device 160, and graphical user interface 400 may include information notifying the user that the requested interaction has not been completed because the entity has been identified as engaging in restricted activity. The identification may include more detail about the restriction (e.g., "This restriction is based on government regulation X") or provide a contact for further information.

At step 314, a second client computing device 180 may request an interaction (e.g., request the interaction via control system 120). The interaction may be requested at a similar time or a different time from steps 301-310 and/or steps 311-313. The interaction may be a request from a client associated with an entity (e.g., a restricted entity or a non-restricted entity) to perform an interaction with a server, computing device, apparatus, or system associated with an organization, a business, a corporation, a non-profit entity, a government, an individual, or the like. The interaction may be a request to download data, to upload data, to transmit data, to process data, to perform a financial transaction (e.g., a deposit, a withdrawal, a transfer, a payment, or the like), to authenticate a client (e.g., via a username, password, passcode, biometric identifier, multifactor authentication, or the like), to access a webpage, to interact with a mobile device application, or the like.

At step 315, control system 120 may allow the requested interaction. For example, control system 120 may allow the interaction based on determining that client computing device 180 is not associated with a restricted entity (e.g., based on a client profile, a flag associated with past interactions with the client, or the like). The interaction may be performed. At step 316, control system 120 may send interaction results (e.g., transmit the requested data, record the requested data, perform the requested transaction, perform the requested processing, or the like).

Figure 3E:
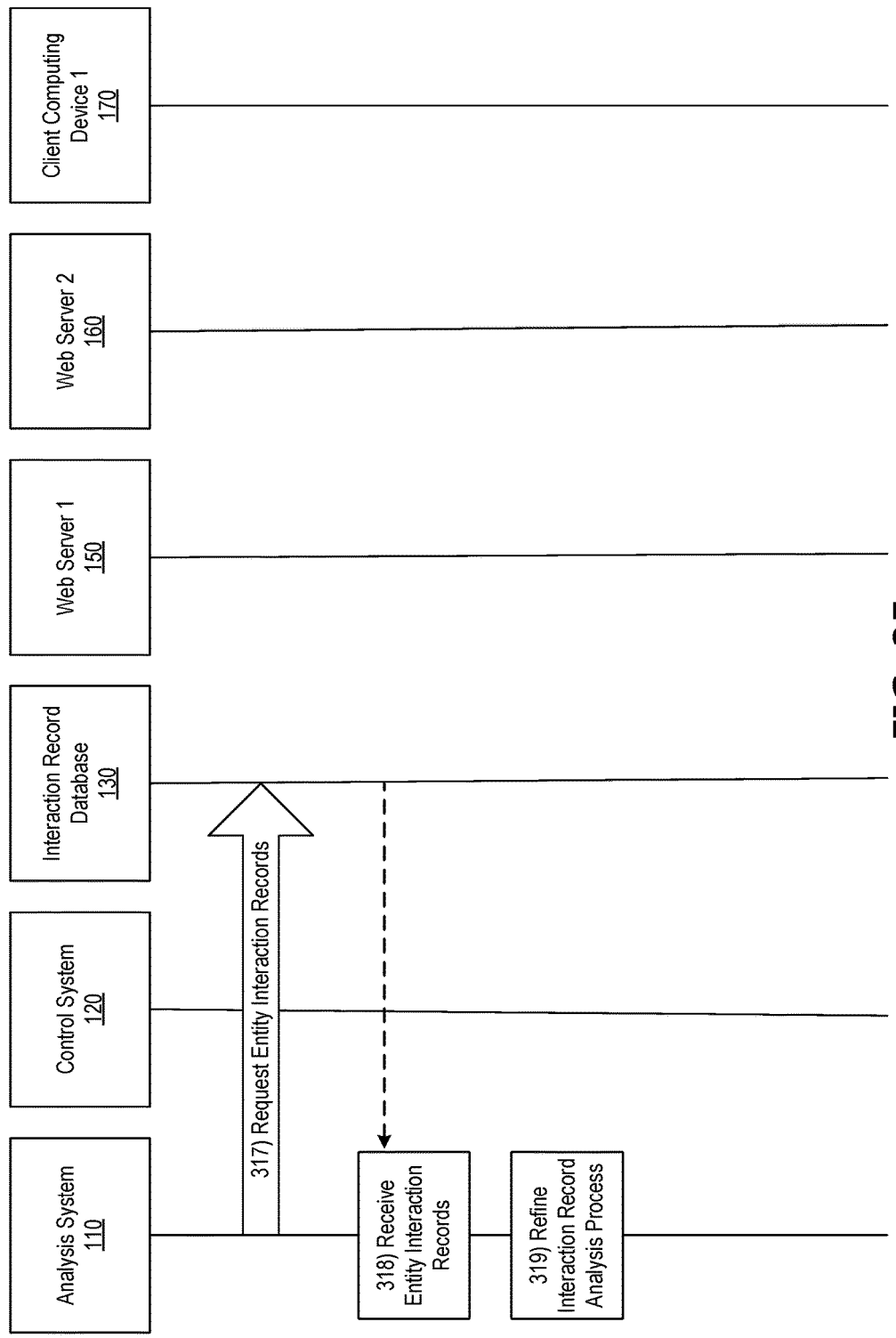

Referring to FIG. 3E, at step 317, analysis system 110 may request entity interaction records. The request may be for all interaction records, or may be for less than all interaction records. The request may be for interaction records that are associated with a particular time or time period, geographic location or geographic area, a particular client or group of clients, or the like. The request may be for interaction records in a particular format. At step 318, analysis system 110 may receive the entity interaction records.

At step 319, analysis system 110 may refine an interaction record analysis process. For example, based on the entity interaction records for a particular entity, analysis system 110 may adjust one or more criteria used in one or more processes (e.g., a process for determining whether an interaction record is associated with a particular entity). By adjusting the process using one or more interaction records for interactions that are known to have taken place with a particular entity, analysis system 110 may identify patterns or other information among the interaction records for that particular entity. Those patterns or other information may be used to adjust (e.g., enhance, optimize) the process for identifying matches to particular entities or types of entities. For example, if a drug-production company or drug dispensary typically engages in cash-intensive operations, then a pattern may be identified among transactions or interactions that are cash intensive and are with an entity that is a known drug-production company or drug dispensary. A matching process may be adjusted to look for the identified pattern.

One or more steps of the event sequence discussed above may be performed by one or more of analysis system 110, control system 120, interaction record database 130, first web server 150, second web server 160, first client computing device 170, and second client computing device 180, as discussed above, and/or may be performed by a different device or system (e.g., one or more of analysis system 110, control system 120, interaction record database 130, first web server 150, second web server 160, first client computing device 170, and second client computing device 180). Furthermore, although the steps are illustrated separately, various steps may be performed in a different order and/or performed simultaneously.

Figure 5:
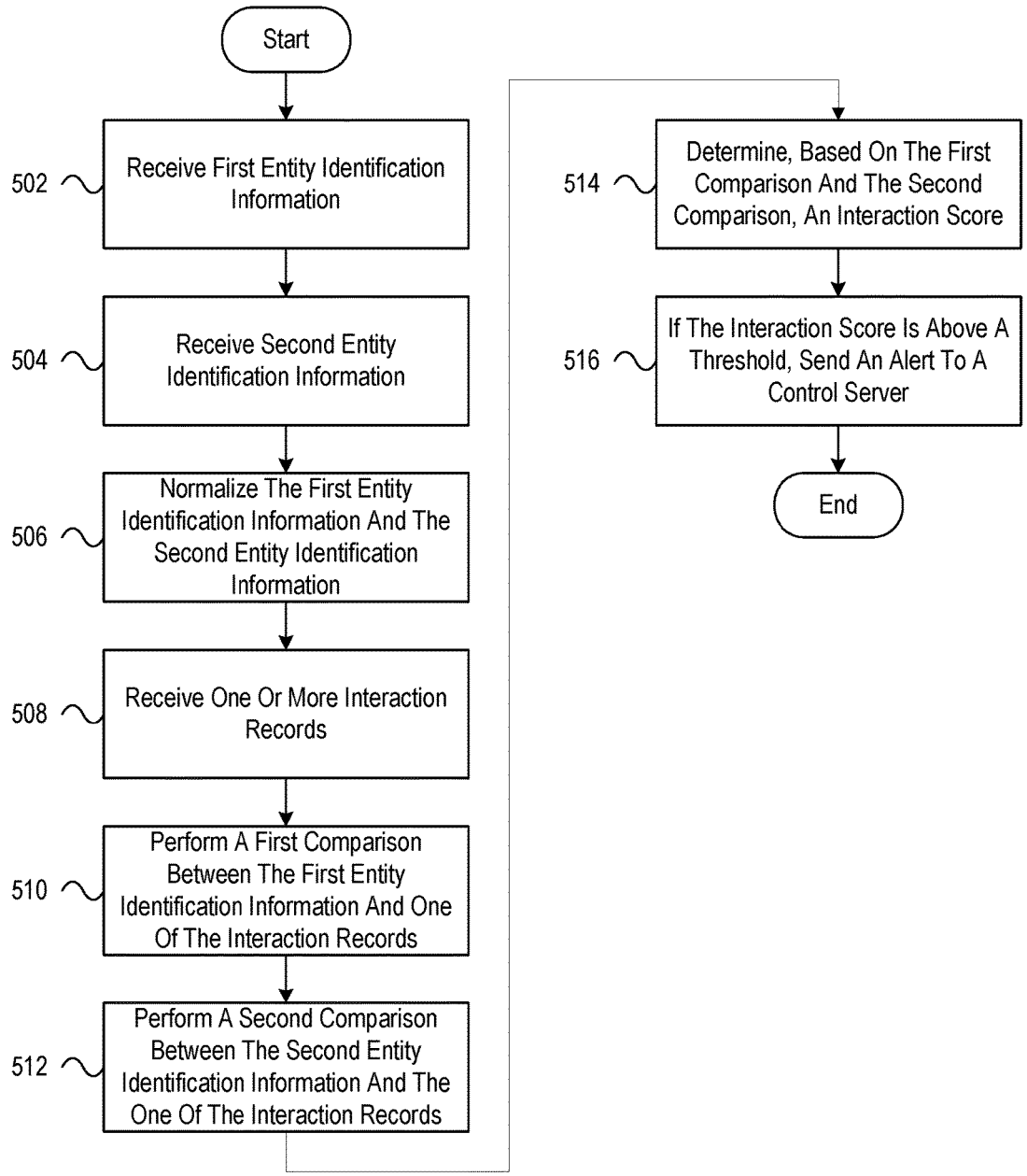
FIG. 5 depicts an illustrative method for controlling interactions with secured information systems using iterative fuzzy searches and comparisons of multiple variables in accordance with one or more example embodiments.

FIG. 5 depicts an illustrative method for controlling interactions with secured information systems using iterative fuzzy searches and comparisons of multiple variables in accordance with one or more example embodiments. Referring to FIG. 5, at step 502, a computing platform having at least one processor, a memory, and a communication interface may receive first entity identification information in a first format from a web server, the first entity identification information being associated with an entity. In step 504, the computing platform may receive second entity identification information in a second format from the web server, the second format being different from the first format, the second entity identification information being associated with the entity. In step 506, the computing platform may normalize the first entity identification information and the second entity identification information to be in one of the first format, the second format, and a third format different from the first format and the second format. In step 508, the computing platform may receive a plurality of interaction records, each of the plurality of interaction records being associated with an interaction between a system associated with the analysis server and a client of the system. In step 510, the computing platform may perform a first comparison between the first entity identification information and one of the plurality of interaction records. In step 512, the computing platform may perform a second comparison between the second entity identification information and the one of the plurality of interaction records. In step 514, the computing platform may determine, based on the first comparison and the second comparison, an interaction score that indicates a likelihood that the entity is associated with the one of the plurality of interaction records. In step 516, the computing platform may, if the interaction score for the one of the plurality of interaction records is above a threshold score, send an alert to a control server, the alert being configured to cause the control server to take an action with respect to the entity.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    receiving, by an analysis server, first entity identification information in a first format from a web server, the first entity identification information being associated with an entity;
    receiving, by the analysis server, second entity identification information in a second format from the web server, the second format being different from the first format, the second entity identification information being associated with the entity;
    normalizing, by the analysis server, the first entity identification information and the second entity identification information to be in one of the first format, the second format, or a third format different from the first format and the second format;
    receiving, by the analysis server, a plurality of interaction records, each of the plurality of interaction records being associated with an interaction between a system associated with the analysis server and a client of the system;
    performing, by the analysis server, a first comparison between the first entity identification information and one of the plurality of interaction records;
    performing, by the analysis server, a second comparison between the second entity identification information and the one of the plurality of interaction records;
    determining, by the analysis server, based on the first comparison and the second comparison, an interaction score that indicates a likelihood that the entity is associated with the one of the plurality of interaction records; and
    if the interaction score for the one of the plurality of interaction records is above a threshold score, sending, by the analysis server, an alert to a control server, the alert being configured to cause the control server to take an action with respect to the entity.

2. The method of claim 1, wherein the alert is configured to cause the control server to block or allow a future interaction with a device associated with the entity.

3. The method of claim 2, wherein the alert is configured to cause the control server to block the future interaction with the device associated with the entity in response to the interaction score being above the threshold score, and wherein the alert is configured to cause the control server to allow the future interaction with the device associated with the entity in response to the interaction score being below the threshold score.

4. The method of claim 3, wherein the alert is configured to cause the control server to set a flag associated with the entity, wherein the control server is configured to allow or block the future interaction with the device further based on the flag.

5. The method of claim 4, wherein the alert is configured to cause the control server to add restricted entity information to a client profile associated with the entity, based on the interaction score being above the threshold score.

6. The method of claim 5, wherein the first comparison between the first entity identification information and the one of the plurality of interaction records comprises performing fuzzy matching between the first entity identification information and the one of the plurality of interaction records.

7. The method of claim 6, wherein the first entity identification information includes a first entity identification variable and a second entity identification variable, and wherein the one of the interaction records includes a first interaction record variable and a second interaction record variable, wherein the first entity identification variable and the first interaction record variable include a first type of information, and wherein the second entity identification variable and the second interaction record variable include a second type of information, the second type of information being different from the first type of information.

8. The method of claim 7, wherein the first entity identification variable and the first interaction record variable are each a required variable, such that if the first entity identification variable and the first interaction record variable do not match within a threshold fuzzy match value, the interaction score for the one of the plurality of interaction records is set to zero.

9. The method of claim 8, wherein the second entity identification variable and the second interaction record variable are each an optional variable, such that the second entity identification variable and the second interaction record variable are not required to match in order for the interaction score for the one of the plurality of interaction records to be greater than zero.

10. The method of claim 9, wherein the first type of information is entity name information, and wherein the second type of information is entity address information.

11. The method of claim 10, comprising:
    if the interaction score is below the threshold score, sending, by the analysis server, a different message to the control server, the different message causing the control server to store, in association with the one of the plurality of interaction records, the interaction score for the entity.

12. The method of claim 11, comprising:
    performing a third comparison between third entity identification information and the one of the plurality of interaction records;
    generating an updated interaction score based on the first comparison, the second comparison, and the third comparison; and
    if the updated interaction score is below the threshold score, sending, by the analysis server, an updating message to the control server, the updating message causing the control server to update the stored interaction score for the entity with the updated interaction score.

13. The method of claim 12, comprising:
    applying a first weight to the first entity identification variable; and
    applying a second weight to the second entity identification variable,
    wherein the first weight and the second weight increase or decrease an impact of the first entity identification variable and the second entity identification variable on the interaction score.

14. The method of claim 13, comprising:
if the interaction score for the one of the plurality of interaction records is above the threshold score:
requesting a different plurality of interaction records associated with a client that is associated with the one of the plurality of interaction records;
performing a third comparison between the first entity identification information and one of the different plurality of interaction records;
performing a fourth comparison between the second entity identification information and the one of the different plurality of interaction records;
determining, based on the third comparison and the fourth comparison, a different interaction score that indicates a different likelihood that the entity is associated with the one of the different plurality of interaction records; and
if the different interaction score is above the threshold score, sending, by the analysis server, a different alert to the control server, the different alert being configured to cause the control server to store an indication of an association between the entity and the one of the different plurality of interaction records.

15. The method of claim 14, wherein if the different interaction score is above the threshold score, the different alert is configured to cause the control server to store a different indication of an association between the client and the entity.

16. The method of claim 15, comprising:
determining whether the entity is subject to one or more restrictions; and
if the entity is subject to the one or more restrictions, implementing, by the control server, the one or more restrictions.

17. The method of claim 16, comprising:
requesting, by the analysis server, the first entity identification information in the first format from the web server via an application programming interface,
wherein receiving the first entity identification information in the first format comprises receiving the first entity identification information in response to the requesting the first entity identification information from the web server via the application programming interface.

18. The method of claim 17, comprising:
adding the client to a blacklist of clients that are not allowed to engage in interactions with a system associated with the analysis server; and
revoking privileges of the client based on the client being added to the blacklist of clients.

19. Non-transitory computer-readable media storing executable instructions that, when executed by one or more processors, cause a system to:
receive first entity identification information in a first format from a web server, the first entity identification information being associated with an entity;
receive second entity identification information in a second format from the web server, the second format being different from the first format, the second entity identification information being associated with the entity;
normalize the first entity identification information and the second entity identification information to be in one of the first format, the second format, or a third format different from the first format and the second format;
receive a plurality of interaction records, each of the plurality of interaction records being associated with an interaction between a system associated with the analysis server and a client of the system;
perform a first comparison between the first entity identification information and one of the plurality of interaction records;
perform a second comparison between the second entity identification information and the one of the plurality of interaction records;
determine, based on the first comparison and the second comparison, an interaction score that indicates a likelihood that the entity is associated with the one of the plurality of interaction records; and
if the interaction score for the one of the plurality of interaction records is above a threshold score, send an alert to a control server, the alert being configured to cause the control server to take an action with respect to the entity.

20. A system comprising:
one or more processors; and
non-transitory memory storing executable instructions that, when executed by the one or more processors, cause the system to:
receive first entity identification information in a first format from a web server, the first entity identification information being associated with an entity;
receive second entity identification information in a second format from the web server, the second format being different from the first format, the second entity identification information being associated with the entity;
normalize the first entity identification information and the second entity identification information to be in one of the first format, the second format, or a third format different from the first format and the second format;
receive a plurality of interaction records, each of the plurality of interaction records being associated with an interaction between a system associated with the analysis server and a client of the system;
perform a first comparison between the first entity identification information and one of the plurality of interaction records;
perform a second comparison between the second entity identification information and the one of the plurality of interaction records;
determine, based on the first comparison and the second comparison, an interaction score that indicates a likelihood that the entity is associated with the one of the plurality of interaction records; and
if the interaction score for the one of the plurality of interaction records is above a threshold score, send an alert to a control server, the alert being configured to cause the control server to take an action with respect to the entity.

* * * * *